Patented Oct. 2, 1928.

1,686,437

UNITED STATES PATENT OFFICE.

THOMAS CLARKSON AND HAMMOND R. HEAL, OF COFFEYVILLE, KANSAS.

REMOVING AMORPHOUS WAX AND ASPHALTIC MATERIAL FROM OIL.

No Drawing.    Application filed October 29, 1921. Serial No. 511,476.

The present invention relates to the production of "Bright stock" or a cylinder oil having a low cold test, from petroleum material.

In carrying out our process crude petroleum is first preferably subjected to a sulfuric acid and alkali treatment, for the removal of the major portion of the asphalt and similar impurities, and the oil is then subjected to distillation, distilling off the gasoline, kerosene and the gas oil. If desired also some of the lighter lubricating oils can be driven off, depending upon the properties desired in the final material. The residue in the still may, if desired, be subjected to acid and alkali purification at this stage, particularly if the crude oil was not so treated, or if the crude oil contains a relatively great proportion of asphalt. Naphtha or similar light hydrocarbon distillate is then added in such amount as to bring the viscosity down to the desired figure. Other light petroleum distillate may be used in place of naphtha. It is advisable to use such an amount of naphtha as will produce a mixture containing from 60 to 80% of naphtha and 40 to 20% of the heavy mineral oil material, depending upon the amount of amorphous wax or asphalt or other similar ingredients present in the oil. It is not necessary at this stage to filter the mixture of solvent and oil through fuller's earth, as has been customary with some of the prior processes.

The oil and solvent are then passed through a heat exchanger in which the mixture is cooled by cold oil and solvent coming from a subsequent stage of the process, after which the mixture is further refrigerated by suitable means, for example, by passing the oil through a coil of pipe in an ammonia expansion chamber, for the purpose of lowering the temperature down to well below 32° F., and preferably to 0° F., or lower. The temperature may be run down to minus 20° F., or even minus 30° F.

The temperature used in this step will determine the cold test of the finished oil. The cold test will be found to be about twenty to thirty degrees (Fahr.) above that at which the filtration is effected, so that to produce an oil of which the cold test is 20°F., a temperature in the refrigeration operation of about 0° F., or down to minus 5° F., is suitable.

The oil and solvent are then passed while at the said low temperature, through a filter press in which the filtering medium consists preferably of very heavy filter paper, such paper being of very fine texture. It is also possible in some instances to employ other filtering media, for example, plates of porous earthenware material, plates of solidified kieselguhr or unglazed porcelain. It appears probable that very thick chamois skin might be suitable in some cases. Filter paper of a very fine texture is preferably used, the same should of course be very strong and thick to prevent breakage by the pressure in the filter press.

It will be understood that a filter press of the character herein referred to, consists of alternate frames and plates, the plates being formed with fine grooves on their surfaces and the filter paper is placed against these plates, the grooves serving to carry off the filtered oil to the normal oil outlet. The filtration is continued until a large amount of residue has been retained in the filter press, when the filtering operation is discontinued and hot naphtha instead of the refrigerated oil and solvent is then run into and through the collection spaces in the filter press. The hot naphtha is allowed to flow through said space (but usually not through the filter paper, the normal oil outlet valve being closed and a valve in the bottom of each frame being opened), until substantially the entire quantity of material filtered from the oil has been removed.

It is of course understood that the solution of amorphous wax and asphaltic materials in the hot naphtha is drawn off from the filter presses through a pipe entirely separate from that containing the filtered oil and solvent mixture.

The filtered liquid, consisting of the oil dissolved in solvent is then passed in heat-exchanging relation with the incoming mixture of oil and solvent, in order to cool the latter, and is then preferably subjected to filtration through fuller's earth or like material to remove the color to any desired extent. It may be stated in this connection that the amount of fuller's earth used up in the decolorizing filters is very much less than would be necessary in the treatment of the oil before the filter-pressing operation.

The solvent is then distilled, leaving the Bright stock ready for shipment or for combining with other oils to produce lubricants of the desired character.

The object of the invention is to remove from the lubricating oil material the amorphous wax and asphaltic materials which it contains. This amorphous wax and asphaltic material after removing the naphtha it contains by distillation is of a plastic constituency, when at room temperature, but has a melting point between 130° and 140° F., and consists largely of what is generally termed "petrolatum" and must be clearly distinguished from "paraffin wax", the latter being a crystalline wax. When the solution of oil and solvent is refrigerated, the soft waxy material is separated, at least in part, in a finely divided state, in which it can be retained by a fine filter. It could not be retained by any ordinary filtering cloth, such as ordinary cotton sheeting.

Two processes have heretofore been in use for removing the amorphous wax, these being the "cold settling process" and the "centrifugal process", the latter being a relatively recent invention. In the cold settling process, the oil is diluted with naphtha or similar distillate, and the mixture well stirred to mix the same, at 100° F. or so, and then the mixture is very gradually cooled down to about 0° F., or lower, and the mixture allowed to stand at this temperature for a long period of time, usually from ten days to six weeks or more, during which time it is kept refrigerated. The petrolatum and similar material during the time stated will, to some extent, separate out in the bottom of the settling tank, and the clear solution is drawn off. In the centrifugal process, the oil and solvent mixture is made up hot, and is also very slowly cooled, the cooling operation requiring two days or more, and the mixture is then run through a very high speed centrifugal bowl separator. On account of the very slight difference in specific gravity between the solidified amorphous wax and the solution of lubricating oil in naphtha, the difficulty in separating, due solely to specific gavity, as in both of the processes above referred to, is very great. Hence, these processes are liable to be quite incomplete, and for this reason it is nearly always necessary to employ other purification steps in connection with both of these prior processes. The settling process requires a very great length of time of storage under refrigerated conditions, and the centrifugal process requires the use of extremely high speed centrifugals, both of which add greatly to the expense. In the present case, the time is very materially reduced, the entire procedure of mixing with solvent, refrigerating and filtering requiring only a few minutes, as distinguished from a month or so (the average time) in the settling process and two days or more in the centrifugal process.

We call attention to the fact that the filtration under pressure, in the separation of "paraffin wax" which is a crystallized material, is old and well known, whereas this process has not been heretofore used in the separation of amorphous wax or asphaltic material, in any commercial operation, so far as we have been advised.

In order to separate the amorphous wax and asphaltic material, from the solution of oil in solvent, it is of the utmost importance that the filter paper used be of a very fine character. Cloth, such as cotton sheeting, duck or the like or ordinary filter blankets will not retain the very fine uncrystallized amorphous material. When substitutes for filter paper are employed, it is to be understood that they must be of a fineness comparable with fine filter paper.

We have above referred to mixing the naphtha and oil in such porportions as to produce a mixture containing 60 to 80% naphtha and 40 to 20% of oil. These percentages are found to give good results, but the amount of solvent should in every case be sufficient to reduce the viscosity to such an extent as to allow ready filtration of the mixture. The best amount of solvent to use will depend on the character, (viscosity of the oil and percentage of amorphous material in particular) of the oil being treated. The use of a great excess of solvent should be avoided, since the refrigeration would become less effective and more costly.

We claim:—

1. A process of treating lubricating oil containing amorphous wax and asphaltic material, which comprises the steps of adding a light petroleum distillate in amount sufficient to lower the viscosity of said oil, refrigerating the solution sufficiently to cause the solidification of a substantial portion of the amorphous wax and asphaltic material, and subjecting the refrigerated solution alone to pressure-filtration through a filtering element of at least as close a texture as fine filter paper, until a substantial quantity of the solidified material has accumulated therein, and thereafter dissolving out such solidified material with a hot solvent.

2. A process of treating lubricating oil containing amorphous wax and asphaltic material, which comprises the steps of adding a light petroleum distillate in amount sufficient to lower the viscosity of said oil refrigerating the solution sufficiently to cause the solidification of a substantial portion of the amorphous wax and asphaltic material, and subjecting the refrigerated solution alone to pressure-filtration through a filtering element of at least as close a texture as fine filter paper, until a substantial quantity of the solidified material has accumulated therein, and thereafter dissolving out such solidified material with a hot light hydrocarbon.

3. A process of treating lubricating mineral oil containing amorphous wax and asphaltic material which comprises distilling off the low boiling point fractions and subjecting the residue to acid and alkali purification, such steps being performed in any desired order, adding to the still residue an amount of light petroleum distillate sufficient to reduce the viscosity of the oil, refrigerating the solution to substantially below the freezing point of water, subjecting the refrigerated solution to pressure-filtration through a filtering material of at least as close a texture as fine filter paper, until a substantial quality of the amorphous wax and asphaltic material has been collected, then discontinuing the filtration and passing a hot light petroleum distillate through the filtering chamber to dissolve a substantial part at least, of the amorphous wax.

In testimony whereof we have affixed our signatures.

THOMAS CLARKSON.
HAMMOND R. HEAL.